(12) United States Patent
Neumann et al.

(10) Patent No.: US 9,780,364 B2
(45) Date of Patent: Oct. 3, 2017

(54) METHOD FOR PRODUCING A COMPOSITE STRUCTURE COMPOSED OF POROUS CARBON AND ELECTROCHEMICAL ACTIVE MATERIAL

(71) Applicants: Christian Neumann, Hungen (DE); Jörg Becker, Niddatal (DE)

(72) Inventors: Christian Neumann, Hungen (DE); Jörg Becker, Niddatal (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 435 days.

(21) Appl. No.: 14/351,864

(22) PCT Filed: Oct. 9, 2012

(86) PCT No.: PCT/EP2012/069920
§ 371 (c)(1),
(2) Date: Apr. 14, 2014

(87) PCT Pub. No.: WO2013/053679
PCT Pub. Date: Apr. 18, 2013

(65) Prior Publication Data
US 2014/0232031 A1 Aug. 21, 2014

(30) Foreign Application Priority Data
Oct. 12, 2011 (DE) ................. 10 2011 115 693

(51) Int. Cl.
*H01M 4/36* (2006.01)
*H01M 4/38* (2006.01)
(Continued)

(52) U.S. Cl.
CPC ........... *H01M 4/366* (2013.01); *H01M 4/386* (2013.01); *H01M 4/387* (2013.01); *H01M 4/583* (2013.01);
(Continued)

(58) Field of Classification Search
CPC ...... H01M 4/366; H01M 4/387; H01M 4/583; H01M 4/625
(Continued)

(56) References Cited

U.S. PATENT DOCUMENTS

2013/0344394 A1 12/2013 Yang et al.

FOREIGN PATENT DOCUMENTS

WO 2012119562 A1 9/2012

OTHER PUBLICATIONS

Xiong Wen Lou et al.: "Designed Synthesis of Coaxial SnO2@carbon Hollow Nanospheres for Highly Reversible Lithium Storage", Advanced Materials, vol. 21, No. 24, Jun. 26, 2009 (Jun. 26, 2009), pp. 2536-2539.
(Continued)

*Primary Examiner* — Basia Ridley
*Assistant Examiner* — James Erwin
(74) *Attorney, Agent, or Firm* — Tiajoloff & Kelly LLP

(57) ABSTRACT

In order to provide an inexpensive product composed of a porous carbon provided with electrochemical active material, said product being suitable particularly for use as a cathode or anode material for a secondary battery, a process comprising the following process steps is proposed: (a) producing a template from inorganic material by gas phase deposition, said template comprising a framework of pores and nanoparticles joined to one another, (b) coating the template framework with an electrochemical active material or a precursor thereof, (c) infiltrating the pores of the template with a precursor substance for carbon, (d) carbonizing the precursor substance to form a carbon layer, (f) removing the template.

10 Claims, 2 Drawing Sheets

Figure 1:
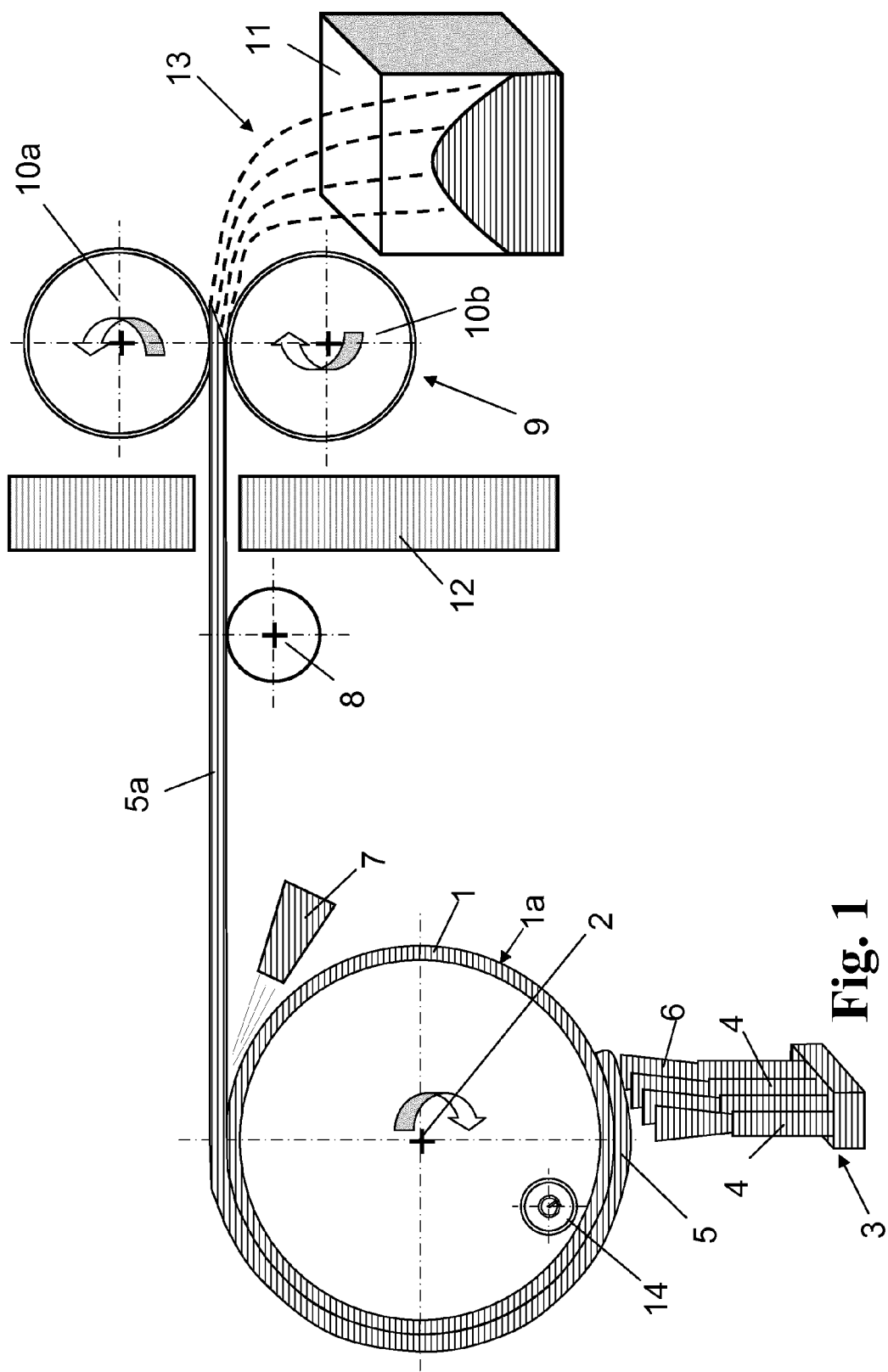

(51) Int. Cl.
    *H01M 4/58*         (2010.01)
    *H01M 4/583*       (2010.01)
    *H01M 4/62*         (2006.01)
    *H01M 10/0525*     (2010.01)

(52) U.S. Cl.
    CPC ......... *H01M 4/5825* (2013.01); *H01M 4/625* (2013.01); *H01M 10/0525* (2013.01)

(58) Field of Classification Search
    USPC .......................................... 429/218.1, 231.8
    See application file for complete search history.

(56) References Cited

OTHER PUBLICATIONS

Xiong Wen (David) Lou et al.: "Hollow Micro-/Nanostructures: Synthesis and Applications", Advanced Materials, Wiley VCH Verlag, DE, vol. 20, No. 21, Nov. 3, 2008 (Nov. 3, 2008), pp. 3987-4019.

Xiong Wen Lou et al.: "Shell-by-Shell Synthesis of Tin Oxide Hollow Colloids with Nanoarchitectured Walls: Cavity Size Tuning and Functionalization", Small, vol. 3, No. 2, Feb. 5, 2007 (Feb. 5, 2007), pp. 261-265.

Espacenet English language abstract of WO 2012119562 A1, published Sep. 13, 2012.

METHOD FOR PRODUCING A COMPOSITE STRUCTURE COMPOSED OF POROUS CARBON AND ELECTROCHEMICAL ACTIVE MATERIAL

The present invention refers to a method for producing a composite structure composed of porous carbon and electrochemical active material.

In the development of portable electronic devices and of cars with electric drive, the demand for rechargeable batteries ("accumulators" or "secondary batteries") is increasing. Basic requirements are a high cell voltage, high charging capacity at an equivalence weight that is as low as possible. Moreover, a long cycle lifetime is required. Especially for commercial applications the electrode materials should be inexpensive, non-toxic, non-explosive and easily processible.

PRIOR ART

Alkali secondary batteries, especially lithium ion batteries, are wide-spread. Their functional principle is based on the insertion and removal (intercalation and deintercalation) of alkali ions in the positive electrode (cathode) that adjoins an electrolyte which allows the movement of the alkali ions. In lithium ion batteries the electrochemical active material is formed by lithium or lithium compounds, the electrochemical active material being present in the cathode as electron acceptor, e.g. as a composite material composed of an oxidic lithium compound in intimate contact with an electrically conductive material which simultaneously forms the electrode framework.

Suitable oxidic lithium compounds are complex oxides of lithium and a transition metal, such as lithium cobalt oxide ($LiCoO_2$), the ternary mixtures thereof with Ni and Mn, or lithium iron phosphate ($LiFePO_4$).

Carbon is often used as the electrically conductive material. EP 1 049 182 A2, for instance, describes a nanocomposite material of $LiFePO_4$ and graphitized carbon which coats the surface of the $LiFePO_4$ nanoparticles as a thin graphite film.

A similar cathodic nanocomposite material for lithium ion batteries is known from Xing-Long Wu et al; "$LiFePO_4$ Nanoparticles Embedded in a Nanoporous Carbon Matrix. Superior Cathode Material for Electrochemical Energy-Storage Devices"; Adv. Mater. 2009 (21), pp. 2710-2714. Nanoparticles of $LiFePO_4$ with a mean particle size of 70 nm are there dispersed in a nanoporous carbon matrix with mesopores in the range of 3.8 nm to 10 nm. The nanoporous carbon matrix is produced by means of sol-gel methods using polymerizable starting substances and by subsequent fine grinding of the dried and solidified gel and mixing with the nanoparticles of the active material. The nanocomposite material obtained thereby is made up of 74% by wt. of $LiFePO_4$ and of 26% by wt. of porous carbon.

In the anode (negative electrode) lithium-containing active material serves as the electron donor and is normally provided in non-oxidized, metallic form. In this case too, a carbon matrix is used for receiving the active material, the matrix being able to reversibly receive and discharge lithium ions without the structural and electrical property of the carbon matrix being changed to a significant degree.

Instead of a carbon matrix, anode materials of silicon, germanium or tin are also very promising because, in contrast to carbon, these are able to form an alloy with lithium and thereby theoretically permit a much higher lithium loading and thus a higher specific charge capacity.

Such anode materials, however, show a considerable volume change in the alloy formation with lithium, and this volume change may lead within a few charging and discharging cycles to a decomposition of the electrode and to a very rapid capacity loss.

To counter this, nanocomposite materials of metal and carbon have been suggested for the formation of the anode, wherein e.g. tin nanoparticles are encapsulated in hollow spheres of carbon with an extremely thin wall (Wei-Min Zhang et al.; "Tin-Nanoparticles Encapsulated in Elastic Hollow Carbon Spheres for High-Performance Anode Material in Lithium-Ion Batteries"; Adv. Mater. 2008 (20), pp. 1160-1165).

To produce the metal-containing hollow spheres, monodisperse $SiO_2$ particles are used with a diameter of 100 nm as a template material. $SnO_2$ with a thickness of 25 nm is deposited on the particles by hydrolysis of $Na_2SnO_3$ and by gas phase deposition, and the template material is removed by etching. On the $SnO_2$ hollow spheres, a porous carbon layer with a thickness of 20 nm is subsequently produced by pyrolysis of glucose under hydrothermal conditions, and said carbon layer is subsequently carbonized by heating at 700° C. to form a graphite layer. Due to the reducing action of the carbon and the high temperature, the $SnO_2$ layer is reduced to metallic tin that collects in liquid phase under the action of the surface tension to form a multitude of spherical tin nanoparticles which adhere to the inner wall of the graphite layer.

The nanospheres obtained thereby are made up of 74% by wt. of tin nanoparticles and of 26% by wt. of carbon and provide a free inner volume for the alloying of lithium with the tin nanoparticles. The inner volume of the hollow spheres and the elasticity of the thin carbon coat diminish the generation of mechanical stresses during alloying with lithium and during dealloying, respectively.

Since the storability of lithium in tin by alloy formation is much higher than that in carbon, one obtains with these nanocomposite materials an efficiency that is the higher the higher the concentration of tin is and the smaller the tin particles are and the thinner the carbon layer is.

Another template method for producing a porous carbon product for electrodes of secondary batteries has recently become known from DE 10 201 0 005 954 A1. A porous $SiO_2$ template of agglomerated or aggregated $SiO_2$ nanoparticles is first produced by hydrolysis or pyrolysis of a silicon-containing starting compound by means of a soot deposition process. The pores are infiltrated with a carbon precursor substance. After calcining the $SiO_2$ template is removed by etching. A porous carbon product is obtained with a hierarchical pore structure.

Technical Objective

For the production of the carbon matrix provided with electrochemical active material, the above-mentioned nanostructure materials require the generation of mono-disperse $SiO_2$ particles as template; here, the template material has to be etched away through the active material already deposited thereon. This may lead to a loss of active material. Alternatively, a monolith previously formed by sol-gel methods must be finely ground in a reproducible manner.

These processes are troublesome, especially when high demands are made on the reproducibility of the achieved properties of the electrode material. By comparison, the last-explained soot deposition method for template production permits a comparatively inexpensive production of carbon products with reproducible pore sizes and pore size distributions. In this respect it would be desirable to be able to use this procedure in the production of porous carbon provided with electrochemical active material.

It is therefore the object of the present invention to indicate a method which permits an inexpensive production of a porous carbon product which is provided with electrochemical active material and is particularly suited for use as cathode or anode material for a secondary battery.

GENERAL DESCRIPTION OF THE INVENTION

This object is achieved according to the invention by a method comprising the following steps:
(a) providing template particles of inorganic template material, each forming a pore-containing template framework of interconnected nanoparticles,
(b) coating the template framework with an electrochemical active material or a precursor thereof,
(c) infiltrating the pores with a precursor substance for carbon,
(d) carbonizing the precursor substance to form a carbon layer,
(e) removing the template material.

The production of the template preferably comprises a soot deposition process in which a feedstock material is converted by hydrolysis or pyrolysis into template material particles and these are deposited on a deposition surface to form a soot body from the template material. The soot body may be present as a monolith or layer. It is used en bloc, or particles obtained therefrom by comminuting are used as the template material.

In comparison with the production method via the "sol-gel route", the soot deposition process is an inexpensive method which permits a low-cost production of templates on an industrial scale. A liquid or gaseous starting substance is here subjected to a chemical reaction (hydrolysis or pyrolysis) and deposited on a deposition surface. The reaction zone is e.g. a burner flame or an electric arc (plasma). With the help of such plasma or CVD deposition methods, which are e.g. known under the names OVD, VAD or POD methods, synthetic quartz glass, tin oxide, titanium nitride and other synthetic materials are produced on an industrial scale.

Primary particles are formed in the reaction zone, said particles agglomerating on their way to the deposition surface into nanoparticles. Depending on the degree of the interaction with the reaction zone on their way to the deposition surface, a different number of primary particles are agglomerating, resulting basically in a wide particle size distribution of the nanoparticles in the range of about 5 nm to about 200 nm. The nanoparticles are interconnected via so-called sinter necks. Rather large cavities or pores that in the soot body and in sections thereof form a system of interconnected macropores are created between the individual nanoparticles. A certain thermal consolidation of the soot body is desired and achieved in that the soot body is partially sintered either during the deposition process or as an alternative or supplement thereto in a separate heating process subsequent to the deposition process, so that a porous coherent template framework is formed in which spherical nanoparticles are aggregated or agglomerated into larger units and are interconnected via so-called "sinter necks".

For the production of the composite product such a porous template with soot structure is coated with the active material or with the precursor thereof, with the inner surfaces of the pores and cavities being covered with the active material, so that the pore structure and particle distribution given in the template is more or less transferred to this coating. Therefore, the active material can also form a three-dimensional network of coherent hollow spheres, so that electrical isolation and de-contacting can mainly be avoided, as shall be explained in more detail further below.

Infiltration of the template pores with the carbon precursor substance is carried out with the help of known techniques, such as immersing, pumping and swiveling using solutions of the precursor substance. Particularly suited are however solvent-free infiltration routes by way of direct infiltration of the template pores with a molten carbon precursor substance. A single infiltration process may be enough in all cases.

The above method steps (b) and (c) can be carried out in one operation in that the active material mixed with the carbon precursor substance is infiltrated into the pores of the template.

Carbonizing the carbon precursor substance according to method step (d) is carried out at a high temperature of up to 3000° C., but preferably at a much lower temperature below 1000° C., in a gas that is free of oxygen, if possible, or under vacuum. The minimum temperature of 500° C. for carbonizing is determined based on the decomposition temperature of the graphitizable precursor substance.

The inorganic template material is preferably removed by chemical dissolution, wherein particularly acids (such as hydrofluoric acid) or bases (such as sodium hydroxide) should be named as solvents in the case of a $SiO_2$ template. Hence, the template just serves as a mechanically or thermally stable framework for the deposition of the active material and the carbon precursor substance.

In contrast to the aforementioned method in which the template is present as spherical particles with a closed cover composed of the active material, the template in the method according to the invention is a soot structure with nanoparticles interlinked in the manner of a network. The template material can here be etched away by the penetrating etchant within the soot structure itself without the active material having to be penetrated by the etchant before. This offers several advantages.

1. The thickness of the active material layer does not present an obstacle to the template being etched away. In this respect the layer thickness of the active material can be optimized with respect to the intended use of the composite product and should be as thick as possible for reasons of capacity.

2. Since the etchant does not have to penetrate the active material layer, the loss of active material otherwise occurring by necessity when the template is being etched away can be avoided or reduced.

The indication of method steps (d) and (e) does not refer to a sequential sequence in the alphabetic order. The removal of the template according to method step (e) takes place either after or before the carbonization of the precursor substance according to method step (d). The method product is at any rate the composite structure of carbon loaded with active material or a precursor thereof.

The porous composite structure obtained after carbonization and removal of the template is composed of the active material and an outer layer of carbon. The active material may also be present as a layer and possibly forms an inner layer connected to the carbon layer.

As a result of the removal of the template material, the volume that has previously been occupied by spherical nanoparticles and their aggregates/agglomerates forms cavities that are interconnected via sinter necks that are now open. Within these cavities the active material is present as a layer or in another morphology. The cavity enclosing the active material shall also be called "active material cavity" hereinafter. Hence, the active material in layer form encloses partly open, locally defined cavities that are interconnected via the former sinter necks and were occupied by the nanoparticles before. The mean sizes of the active material cavities are in the range of mesopores that typically have a pore size in the range of 2 to 50 nm and more. The active material cavities are three-dimensionally interlinked via channels (former sinter necks).

Hollows are also found outside the active material cavities. These result from the interstices of the former nanoparticles, and they are more or less filled in the composite structure by the layers of carbon and the active material. These hollows are also interconnected, but extend over rather long routes and form a system of interconnected macropores. This internal pore structure with oligomodal pore size distribution is typical of a "hierarchical porosity" of the porous composite structure, which in the final analysis is due to the soot deposition process by means of which an anisotropic mass distribution with hierarchical pore structure is produced.

Substances which are suited or provided to react or alloy with the already existing active material or with the precursor substance thereof can be accommodated and fixed in the active material cavities. On account of the free pore volume within the cavities, an additional accommodation of such substances, particularly of lithium, does not lead to an increase in volume. Likewise, substances, such as lithium ions, can be discharged from the active material and the cavities without this process changing the volume of the cavities in any way. As a result, intercalations and deintercalations of active material are possible to the extent predetermined by the pore volume of the cavities, without any significant mechanical stresses arising.

In contrast to the completely enclosed hollow spheres known from the prior art, and despite the fact that the active material cavities are partly open and interconnected, which guarantees accessibility for lithium or the insertion of additional active material, the active material cavities are also suited for retaining constituents of the active material that are e.g. released during the discharging operation. Since the active material cavities are interconnected in the manner of a framework, they are freely accessible for the active material and particularly for lithium, so that the same electrochemical potential is obtained everywhere during the charging and discharging process. By contrast, mutual electrical contacting must be ensured in a complicated way in the case of the closed hollow spheres known from the prior art.

With the help of the method according to the invention one obtains an inexpensive composite product of porous carbon with high porosity and relatively high electrical conductivity in direct connection with an active material for electrochemical energy generation. The active material cavities contained in the composite product with sizes in the nanometer range are suited for fixing and enclosing further substances, particularly lithium, so that the composite product is particularly suited for use as an electrode material for lithium alloys.

Several method variants are suited for preparing the coating composed of the active material or the precursor thereof on the surfaces of the template pores.

In a first, particularly low-cost procedure, it is intended that the coating of the template framework according to method step (b) is carried out by input of the precursor in a liquid phase.

The active material or its precursor, respectively, is here dispersed in a liquid or is present as a liquid or in dissolved form.

The active material preferably contains Sn, with $SnO_2$ being used as the precursor. A coating with $SnO_2$ can e.g. be carried out via a solution of $Na_2SnO_3$ in urea as a liquid solvent.

As an alternative thereto, a procedure has proved to be useful in which the active material or the precursor thereof is present in the form of nanoparticles that are introduced into the pores of the template in a dispersion with the precursor substance during infiltration according to method step (c). The nanoparticles preferably contain $LiFePO_4$. In a second procedure which is preferred with respect to a particularly uniform and complete surface occupation, the coating according to method step (b) is carried out by deposition of the precursor from the gas phase.

A precondition for this is a precursor for the active material which can be transferred in a technologically acceptable temperature range into the gas phase. As a suitable example thereof, an active material should be mentioned that contains silicon, wherein $SiH_4$ which decomposes at an elevated temperature is used as the precursor.

For infiltration according to method step c) a precursor substance is e.g. used for non-graphitizable carbon, particularly water-soluble carbohydrate, preferably saccharose. Water-soluble carbohydrates are available as inexpensive mass chemicals. The solutions of the carbohydrates are distinguished by a low viscosity, so that narrow pore channels can also be infiltrated easily, completely and evenly. After infiltration and removal of the solvent a layer of non-graphitic and also non-graphitizable, porous carbon is obtained therefrom after carbonization on the surfaces of the template, said carbon being also called "turbostratic carbon" or "hard carbon" in the literature.

In comparison with graphite, however, turbostratic (non-graphitizable) carbon exhibits a comparatively high microporosity which can bind large amounts of electrolyte or active material, which are thus withdrawn from the electrochemical process. For infiltrating according to method step c) a precursor substance is therefore preferably used for graphitizable carbon, particularly pitch.

Pitch, particularly "mesophase pitch", is a carbonaceous material which can relatively easily form a graphite-like structure with low microporosity. After carbonizing the infiltrated pitch melt therefore forms a graphite-like layer structure which may also contain turbostratic portions, but is more ordered and more graphite-like than the turbostratic high-porosity carbon obtained from the non-graphitizable precursor, and which particularly shows a low microporosity and thus also a smaller specific surface area and a comparatively high electrical conductivity. During carbonization the graphitizable precursor substance is subjected to a significant rearrangement of graphene layers towards a graphite structure and is also called "soft carbon" in the literature.

With respect to an adsorption for the electrolyte that is as small as possible, the carbon layer after carbonization shows a low microporosity that is characterized in that micropores with a pore diameter of less than 2 mm account for less than 10% of the total pore volume thereof. Micropores are characterized by a pore diameter of 2 nm and less.

Especially with respect to the mechanical stability of the layer structure and a high electrical conductivity the carbon layer after carbonizing has a mean layer thickness of at least 2 nm.

The graphite-like deposition of carbon forms the outer layer of the layer composite. It is bonded to the active material either directly or indirectly via an intermediate layer. An intermediate layer has turned out to be helpful especially in those cases where the graphite-like carbon layer does not adhere or hardly adheres to the active material.

With respect thereto a procedure is preferred in which infiltrating according to method step (b) comprises a first infiltration stage and a second infiltration stage, wherein a precursor substance for non-graphitizable carbon is used in the first infiltration stage, and the precursor substance for the graphitizable carbon is used in the second infiltration stage.

After carbonization the precursor substance for non-graphitizable carbon forms a layer of microporous carbon. This layer is in direct contact with the active material, wherein the turbostratic structure of the microporous carbon contributes to the improved adhesion of the active material. A small thickness of the layer of microporous carbon is already enough for the action as an adhesion promoter.

It is intended in a particularly preferred method variant that during coating according to method step (b) at least 50%, preferably at least 70%, of the pore volume of the pores of the template is filled with the electrochemical active material or the precursor for the active material.

The greatest part of the template pore volume is here occupied by the active material, so that it approximately represents a negative imprint of the original template nanoparticles. This yields a particular charging capacity of the electrode produced therefrom.

For producing the template framework according to method step (a), spherical interconnected nanoparticles are preferably produced.

After removal of the template material, formerly spherical nanoparticles provide a large inner volume for the accommodation of the active material and of lithium at a small surface area.

Preferably, the composite structure is produced in the form of porous, non-spherical carbon flakes.

In the method according to the invention the composite structure is obtained as a monolith or with platelet- or flake-like morphology. At any rate it can easily be divided into smaller particles that are further processed for instance by means of common paste or slurry methods into molded bodies or layers. The further processing of the composite structure into an electrode for instance for a lithium battery is carried out on the basis of the methods known from the prior art.

On account of their non-spherical morphology the flakes or platelets adjoining one another with their flat sides permit an optimum electrical contacting and simultaneously an optimum infiltratability with lithium due to the great ratio of surface to volume.

EMBODIMENT

The invention shall now be explained in more detail with reference to embodiments and a drawing. In detail, in a schematic illustration, FIG. 1 shows an apparatus for producing $SiO_2$ granulate particles which serve as a template in the method according to the invention;

FIGS. 2 to 6 show method steps in the production of the carbon product according to the invention, in a schematic illustration.

The apparatus illustrated in FIG. 1 serves to produce porous granulate particles of $SiO_2$ which are used in the method according to the invention as hard template. The apparatus comprises a drum 1 which is rotatable about its rotation axis 2 and consists of a base body of special steel which is covered with a thin layer of silicon carbide. The drum 1 has an outer diameter of 30 cm and a width of 50 cm. A layer 5 of $SiO_2$ soot is deposited on the outside surface 1a of the drum 1 and is directly densified slightly thermally into a $SiO_2$ porous soot plate 5a.

Flame hydrolysis burners 4 of which four are arranged one after the other in a common burner row 3 in the direction of the longitudinal axis 2 of the drum are used for soot deposition. The burner row 3 is reciprocated in parallel with the rotation axis 2 between two stationary turning points. As combustion gases, oxygen and hydrogen as well as octamethylcyclotetrasiloxane (OMCTS) are supplied to the flame hydrolysis burners 4 as feedstock material for the formation of $SiO_2$ particles. The size of the $SiO_2$ primary particles produced thereby is in the nanometer range, wherein plural primary particles agglomerate in the burner flame 6 and are obtained in the form of more or less spherical aggregates having a specific BET surface area in the range of 25 $m^2/g$, which form a continuous, evenly thick $SiO_2$ soot layer 5 on the drum outside surface 1a.

In the embodiment the rotational speed of the drum 1 and the deposition rate of the flame hydrolysis burners 4 are matched such that a $SiO_2$ soot layer 5 with a width of about 40 cm and a thickness of about 45 µm is obtained (the soot layer is plotted with an exaggerated thickness in FIG. 1 for reasons of illustration). The burners 4 simultaneously induce a certain pre-sintering of the soot layer 5 into a soot plate 5a in that they produce a mean temperature of about 1200° C. on the surface of the topmost soot layer. Pre-sintering is supported by a tubular infrared radiator 14 which is arranged within the drum 1, which is formed as a hollow drum, in the left lower quadrant, and which heats the outside surface of the drum 1 shortly after application of the soot layer 5 from the inside.

The porous, slightly pre-sintered soot plate 5a obtained thereby has a mean relative density of about 22% (based on the density of quartz glass with 2.21 $g/m^3$).

After slightly more than half a drum rotation the soot plate 5a passes into the sphere of action of a blower 7 by means of which a gas stream directed against the bottom side of the soot plate 5a is produced, so that the soot plate 5a lifts off from the drum outside surface 1a.

The soot plate 5a is subsequently supplied via a support roll 8 to a crushing tool 9 which consists of two counter-rotating rolls 10a, 10b between which a gap is provided having the thickness of the soot plate 5a, and the surfaces of which are provided with longitudinal profiles.

The soot plate 5a passing through the gap is divided by the longitudinal profiles of the rolls 10, 10a into fragments of about the same size (granulate particles 13) which are collected in a collection container 11.

A partition wall 12 is provided between the drum 1 and the crushing tool 9; the partition wall 12 is provided with an opening for passing the soot plate 5a therethrough and serves to shield the soot deposition process against the impacts of the comminuting process.

The granulate particles 13 obtained according to the method have a platelet- or flake-like morphology and a thickness corresponding approximately to the thickness of the soot plate 5a, i.e. about 45 µm. They exhibit more or less planar top and bottom sides as well as lateral fracture areas with open pores. Due to the described crushing operation the granulate particles 13 also have about the same size, resulting in a narrow grain size distribution. The structural ratio "A", i.e. the ratio of maximum structure width (a or b) and thickness (c) of the granulate particles 13, is about 10 in the embodiment.

The granulate particles 13 produced in this way serve as a template for the production of porous carbon flakes, as is schematically shown in FIGS. 2 to 6 and explained in more detail hereinafter with reference to said figures.

EXAMPLE 1

Figure 2:
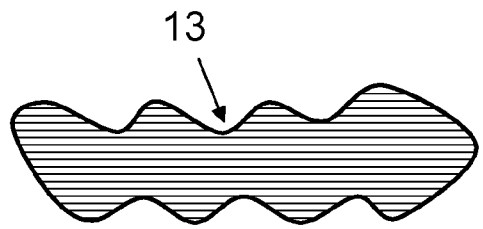

Viewed under the microscope, the non-spherical platelet-shaped granulate particles 13 are composed of a plurality of more or less spherical agglomerates of $SiO_2$ nanoparticles. Such a nanoparticle agglomerate 13 is schematically shown in FIG. 2.

Figure 3:
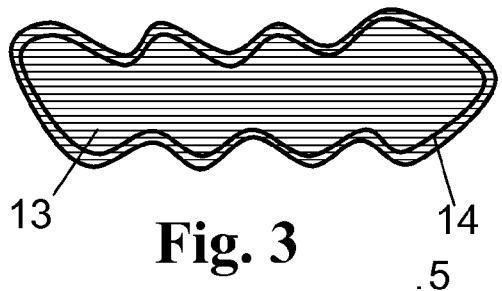

The granulate particles 13 are introduced into a solution of urea and $NaSnO_3$. After evaporation of the solvent a film 14 of $SnO_2$ with a mean thickness of about 50 nm, which is schematically shown in FIG. 3 and which serves as an electrochemical active material in the sense of the invention, remains on the inner and outer surfaces of the granulate.

The granulate particles coated in this way are homogeneously intermixed with finely ground pitch powder in the weight ratio 1:4 (pitch:granulate particles), and the particle mixture is heated to a temperature of 300° C. The low-viscosity pitch envelopes the small $SiO_2$ granulate particles 13 and penetrates into the pores and infiltrates the same. The weight ratio of pitch and granulate particles is here chosen such that the pitch fills the pores to such an extent that after an infiltration period of 30 min there is hardly any significant free pore volume left.

Figure 4:
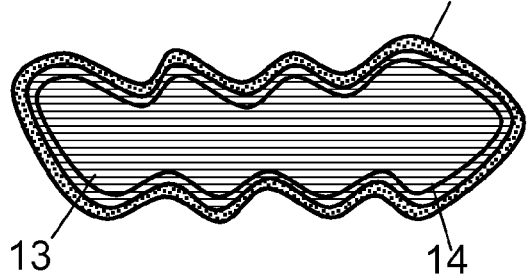

FIG. 4 schematically shows the composite which is obtained thereby and consists of granulate particles 13 and which is enveloped by a $SnO_2$ layer 14 and a pitch layer 15.

The quartz glass of the granulate particles 13 is subsequently removed in that the particles are introduced into a bath of 2 molar NaOH solution. Since the granulate particles 13 consist of nanoparticles interconnected in the manner of a network, the NaOH solution can penetrate within the network structure until the whole template material is removed.

Figure 5:
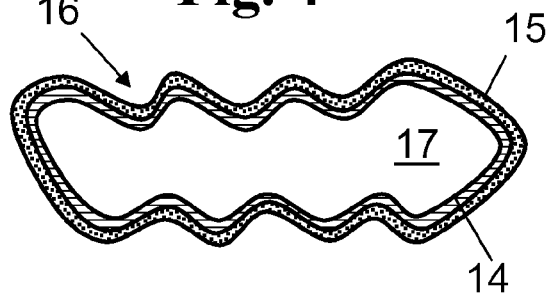

FIG. 5 schematically shows the layer composite 16 which is obtained after the $SiO_2$ granulate particles have been etched away and which consists of the $SnO_2$ layer 14 and the pitch layer 15. The layer composite 16 is approximately a negative image of the mass distribution of the original $SiO_2$ granulate particles 13. The layers 14; 15 surround a cavity 17.

Subsequently, the composite structure is heated in nitrogen to a temperature of 700° C. and the pitch is thereby reduced (carbonized) to carbon. This also leads to a reduction of $SnO_2$ to tin; the metal can here also be liquefied for a short period of time and contract into fine droplets 20 within the cavity 17.

Figure 6:
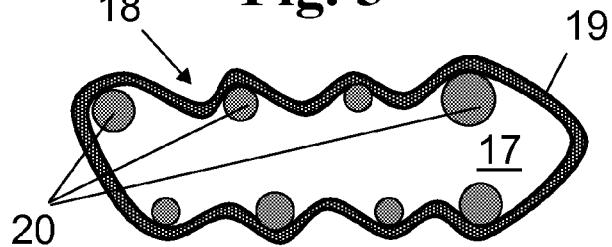

As outlined in FIG. 6, the composite structure 18 obtained thereby consists of a graphite-like carbon layer 19 which forms the inner wall of an active material cavity 17, with fine particles 20 of tin adhering to the carbon layer 19. The carbon layer 19 has a low porosity and it has a thickness of about 50 nm on average. In this connection it should be noted that the illustration of FIGS. 2 to 6 is not true to scale. The composite structure 18 extends in all space directions and forms a carbon product which is loaded with active material 20 and which has a hierarchical pore structure. It is important that the cavity 17 is not completely closed, but is in fluidic communication with other mesopores and macropores, so that the tin particles 20 can be subjected to a further chemical treatment, and further, electrochemically active substances, and especially lithium, can be introduced into the cavity 17.

The composite structure obtained thereby is further comminuted, if necessary. This yields carbon flakes loaded with active material, in the case of which rather large cavities extend in the manner of channels through a finely rugged surface. These carbon flakes with hierarchical pore structure are particularly well suited for the production of electrode layers of a rechargeable battery. To this end they are infiltrated in a known manner with lithium which either fully or partly fills the cavities 17 formerly occupied with template particles 13. Also substances formed and released upon discharge of the battery remain physically bound in the cavities 17, whereby it is prevented that they are evenly distributed in the electrolyte and are thus no longer available for the electrochemical reaction, and it is prevented that the individual particles de-contact electrically.

EXAMPLE 2

The pores of the granulate particles 13 are coated by deposition of $SiH_4$ from the gas phase. $SiH_4$ is decomposed due to an increased temperature, so that a silicon layer having a thickness of about 20 nm is formed on the accessible surfaces of the granulate particles 13. Silicon thereby forms the electrochemical active material in the sense of the invention.

The granulate particles coated in this way are infiltrated with liquid pitch and thereby provided with a layer of pitch, as described with reference to Example 1. The composite which is obtained thereby and consists of granulate particles and is enveloped by a silicon layer and a pitch layer is subsequently heated to a temperature of 700° C. and the pitch is thereby reduced to carbon.

The quartz glass of the granulate particles is subsequently removed in that the particles are introduced into a hydrofluoric acid bath. The hydrofluoric acid can here penetrate within the network structure of the granulate particles, so that the whole template material is removed within a few minutes. Since silicon shows a much lower etch rate in hydrofluoric acid than the $SiO_2$ of the granulate particles, the silicon layer is not significantly reduced during this etching process.

The composite layer which is obtained after the $SiO_2$ granulate particles have been etched away and which consists of silicon layer and carbon layer is approximately a negative image of the mass distribution of the original $SiO_2$ granulate particles. The layers surround an active material cavity. The composite structure extends in all space directions and forms a carbon product which is coated with active material and has a hierarchical structure.

The cavities are not fully closed, but are in fluidic communication with other mesopores and macropores, so that the silicon layer can be subjected to a further chemical treatment and can particularly be alloyed with lithium.

The composite structure obtained thereby is further comminuted, if necessary, and further processed into anode material for a secondary battery, as has been explained above with reference to Example 1.

EXAMPLE 3

In a modification of the procedure of Example 2 a two-stage infiltration process of the pores with carbon is provided after coating of the granulate particles with active material in the form of silicon.

The coated granulate particles are here first introduced into an immersion bath of an aqueous saturated solution of sucrose. The impregnated material is subsequently dried. This impregnation and drying process is repeated once. A dried sucrose layer is formed in the pores of the granulate particles and on the surfaces of the nanoparticle agglomerates previously coated with active material. It is carbonized by heating in nitrogen at 700° C. into a film of turbostratic carbon with a thickness of about 3 nm, which shows a certain microporosity and high adhesion power vis-à-vis the silicon layer due to its turbostratic structure.

Subsequently, the granulate particles which were thus coated before are infiltrated and further processed, as explained with reference to Example 2.

EXAMPLE 4

To produce a cathodic material for secondary batteries based on the complex lithium compound $LiFePO_4$, nanoparticles of said compound are homogeneously mixed into liquid pitch. The pitch loaded with the active material is ground to a particle size of about 15 μm after cooling and is mixed with $SiO_2$ granulate particles. The particle mixture is heated to a temperature of 300° C., so that the mixture of low-viscosity pitch and the active material enters into the pores of the $SiO_2$ granulate particles, so that a coating with pitch and active material particles embedded therein is obtained. The mean size of the nanoparticles corresponds approximately to the size of the thickness of the pitch layer.

The coated granulate particles obtained thereby are heated to a temperature of 700° C. in nitrogen atmosphere, and the pitch is carbonized to graphite-like carbon with a low microporosity in such a manner that micropores with a pore diameter of less than 2 nm account for less than 6% of the total pore volume of the carbon layer.

During carbonization the $LiFePO_4$ particles embedded in the coating are mainly maintained despite the reducing effect of the carbon.

After the $SiO_2$ of the granulate particles has been removed by etching in 2 molar NaOH solution, the surface of the carbon layer that has so far been occupied by the $SiO_2$ of the granulate particles and forms the inner wall of cavities that are interconnected via former sinter necks is also accessible. The porous composite structure produced thereby is characterized in that the graphite-like carbon layer has embedded therein particles consisting of the active material $LiFePO_4$ which adjoin or project over the surface of the carbon layer. The active material particles embedded thereby are thus easily accessible on the one hand via pores of the composite structure for the electrolyte of a secondary battery and they are on the other hand electrically contacted in a reproducible manner via the graphite-like, hardly porous carbon layer.

LIST OF REFERENCE NUMERALS

Drum 1
Drum outside surface 1a
Rotation axis 2
Burner row 3
Flame hydrolysis burner 4
Layer 5
Soot plate 5a
Burner flame 6
Blower 7
Support roll 8
Crushing tool 9
Rolls 10a, 10b
Collection container 11
Partition wall 12
Granulate particles 13
$SnO_2$ layer 14
Pitch layer 15
Layer composite 16
Cavity 17
Composite structure 18
Carbon layer 19
Particles of tin 20
Structural ratio "A

The invention claimed is:

1. A method for producing a composite structure of porous carbon and electrochemical active material, said method comprising:
   a) providing template particles of inorganic template material, each of said particles forming a template framework of interconnected nanoparticles, said template framework containing pores,
   b) coating the template framework with a coating material that is an electrochemical active material or a precursor thereof,
   c) infiltrating the pores with a precursor substance for carbon,
   d) carbonizing the precursor substance to form a carbon layer, and
   e) removing the template material;
   wherein in the infiltrating according to method step (c) the precursor substance is a precursor for graphitizable carbon; and
   wherein infiltrating according to method step (c) comprises a first infiltration stage and a second infiltration stage, wherein a second precursor substance is a precursor for non-graphitizable carbon and is used in the first infiltration stage, and the precursor substance for graphitizable carbon is used in the second infiltration stage.

2. A method for producing a composite structure of porous carbon and electrochemical active material, said method comprising:
   a) providing template particles of inorganic template material, each of said particles forming a template framework of interconnected nanoparticles, said template framework containing pores,
   b) coating the template framework with a coating material that is an electrochemical active material or a precursor thereof,
   c) infiltrating the pores with a precursor substance for carbon,
   d) carbonizing the precursor substance to form a carbon layer, and
   e) removing the template material; and
   wherein in the infiltrating according to method step (c), the precursor substance is pitch.

3. The method according to claim 1, wherein the coating material of method step (b) is the precursor in a liquid phase.

4. The method according to claim 1, wherein the electrochemical active material contains Sn and wherein the precursor is $SnO_2$.

5. The method according to claim 1, wherein during coating according to method step (b) at least 50% of a pore volume of the pores of the template framework are filled with the electrochemical active material or the precursor for the electrochemical active material.

6. The method according to claim 1, wherein the template particles are spherical, interconnected nanoparticles.

7. The method according to claim 2, wherein the coating material of method step (b) is the precursor in a liquid phase.

8. The method according to claim 2, wherein the electrochemical active material contains Sn and wherein the precursor is $SnO_2$.

9. The method according to claim 2, wherein during coating according to method step (b) at least 50% of a pore volume of the pores of the template framework are filled with the electrochemical active material or the precursor for the electrochemical active material.

10. The method according to claim 2, wherein the template particles are spherical, interconnected nanoparticles.

* * * * *